July 18, 1961  E. B. BLOCK ET AL  2,993,118
AUTOMATIC DISTRESS SIGNALLER
Filed Sept. 23, 1958  5 Sheets-Sheet 1
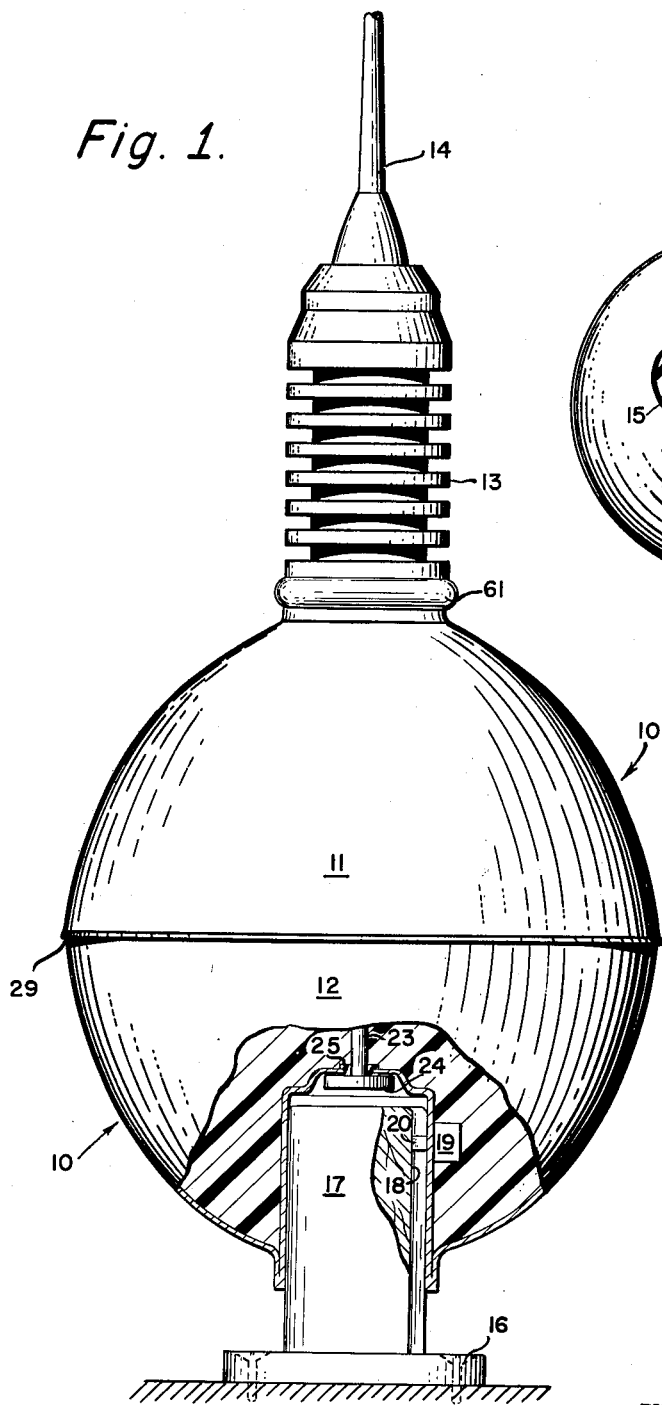
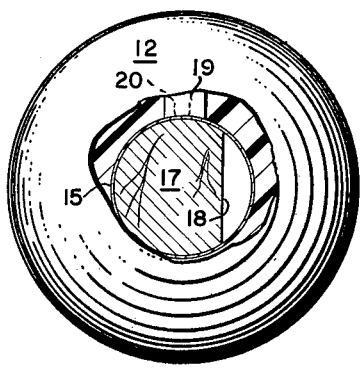
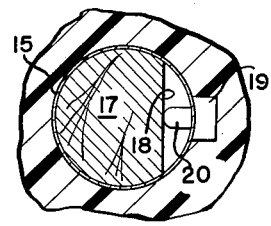
Edwin B. Block,
Jay M. Block,
Paul Masley,
INVENTORS.
BY
Norman L. Chalfin
AGENT.

Edwin B. Block,
Jay M. Block,
Paul Masley,
INVENTORS

BY Norman L. Chalfin
AGENT.

July 18, 1961 E. B. BLOCK ET AL 2,993,118
AUTOMATIC DISTRESS SIGNALLER
Filed Sept. 23, 1958 5 Sheets-Sheet 4

Edwin B. Block,
Jay M. Block,
Paul Masley,
INVENTORS

BY *Norman L. Chalfin*

AGENT

July 18, 1961  E. B. BLOCK ET AL  2,993,118
AUTOMATIC DISTRESS SIGNALLER
Filed Sept. 23, 1958  5 Sheets-Sheet 5
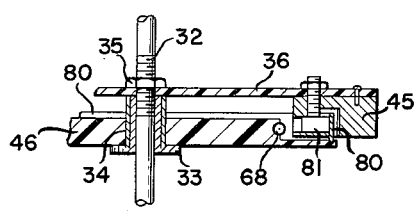
Fig. 8.
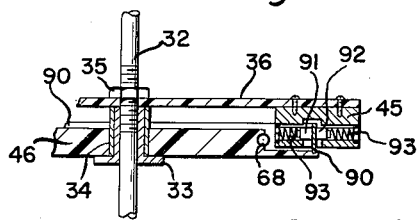
Fig. 9.
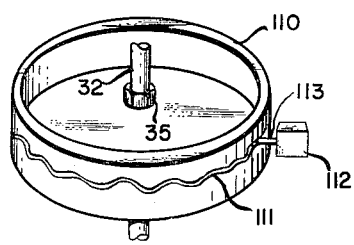
Fig. 11.
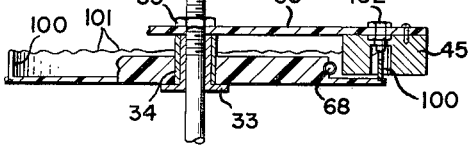
Fig. 10.
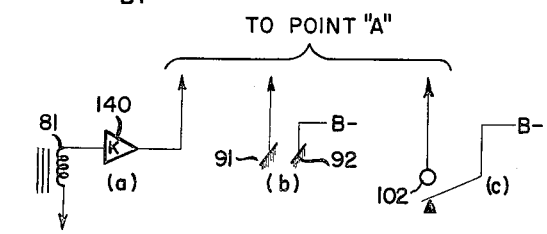
Fig. 12.
Fig. 13.
Edwin B. Block,
Jay M. Block,
Paul Masley,
INVENTORS
BY Norman L. Chaffin
AGENT.

United States Patent Office 2,993,118
Patented July 18, 1961

2,993,118
AUTOMATIC DISTRESS SIGNALLER
Edwin B. Block and Jay M. Block, Playa Del Rey, and Paul Masley, Los Angeles, Calif., assignors to Aquatronic Industries, Inc., Los Angeles, Calif., a corporation of California
Filed Sept. 23, 1958, Ser. No. 762,766
8 Claims. (Cl. 250—17)

This invention relates to signalling devices and more particularly to an automatic distress signaller.

At sea, or on inland or coastal waters small craft may not always be in sight of shore for help in an emergency. The craft may not have radio communication equipment, or if it has such equipment, the emergency situation may have damaged the radio or rendered it inaccessible to make a distress call. In such situations it would be desirable to have an automatic device which could be activated manually or which would float from the craft upon the water and be activated when it does so float.

This invention contemplates an automatic radio distress signalling device which normally is placed in such a location on the craft, as to be readily removable and thrown over the side, the act of moving placing the device in operation. Alternatively, in the event of a mishap to the craft which may result in its capsizing or sinking, the automatic signalling device of this invention is so devised that it will float from its mounting and become operative as soon as it does so to transmit an emergency distress signal.

The device as contemplated in this invention includes a water tight buoyant housing within which there is sealed a self-contained and self-powered radio signal transmitter, including a means of generating a code to interrupt the radio signal generated by this transmitter to transmit the well known "SOS" signal. The code as contemplated by this invention, includes the emergency call "SOS," or other established international distress code signal along with an identifying code signal which may be arranged to be included under a governmental agency responsible for the assistance of craft in distress. When the buoyant signal transmitter of this invention goes into operation in an emergency on prearranged emergency frequency, the distress assistance agency will receive the signals transmitted. By well-known triangulation techniques the location of the distress signaller and the identity of the craft in distress by its coded signals will be possible and appropriate aid dispatched.

Accordingly, it is an object of this invention to provide an automatic, self-contained, self-powered distress signal transmitter for broadcasting a coded message in an emergency.

It is another object of this invention to provide a buoyant container incorporating a coded-radio-signal transmitter capable of automatic operation in an emergency.

It is a further object of this invention to provide an emergency distress signaller having a coded radio signal generating means normally inoperative but capable of being rendered immediately operative in an emergency situation.

It is still another object of this invention to provide a radio signal transmitting device including a pre-arranged code generating system and having an activating means rendering it operative in emergencies.

These and other objects of this invention will be more fully understood from the specification thereof which follows taken together with the accompanying drawings and delineated in the appended claims.

In the drawings:

FIGURE 1 is an overall external view of the buoyant automatic distress signaller of this invention in one embodiment thereof, with a cutaway portion showing the mounting base features thereof;

FIGURE 2 is a bottom cutaway view of the invention showing further details of the mounting base;

FIGURE 3 is a cross-sectional detail of FIGURE 1 to show features of a switching control means for the invention;

FIGURE 8 is a detail of a form of code wheel that may be used with the invention;

FIGURE 9 illustrates another form of code wheel that may be used with the invention;

FIGURE 10 illustrates a further form of code wheel that may be used with the invention;

FIGURE 11 illustrates still another form of code wheel that may be used with the invention;

FIGURE 12 illustrates a typical electrical circuit for the transmitter portion of the invention; and FIGURE 13 illustrates forms of switching mechanisms operable with code wheels of the types shown in FIGURES 9, 10 and 11.

Figure 4:
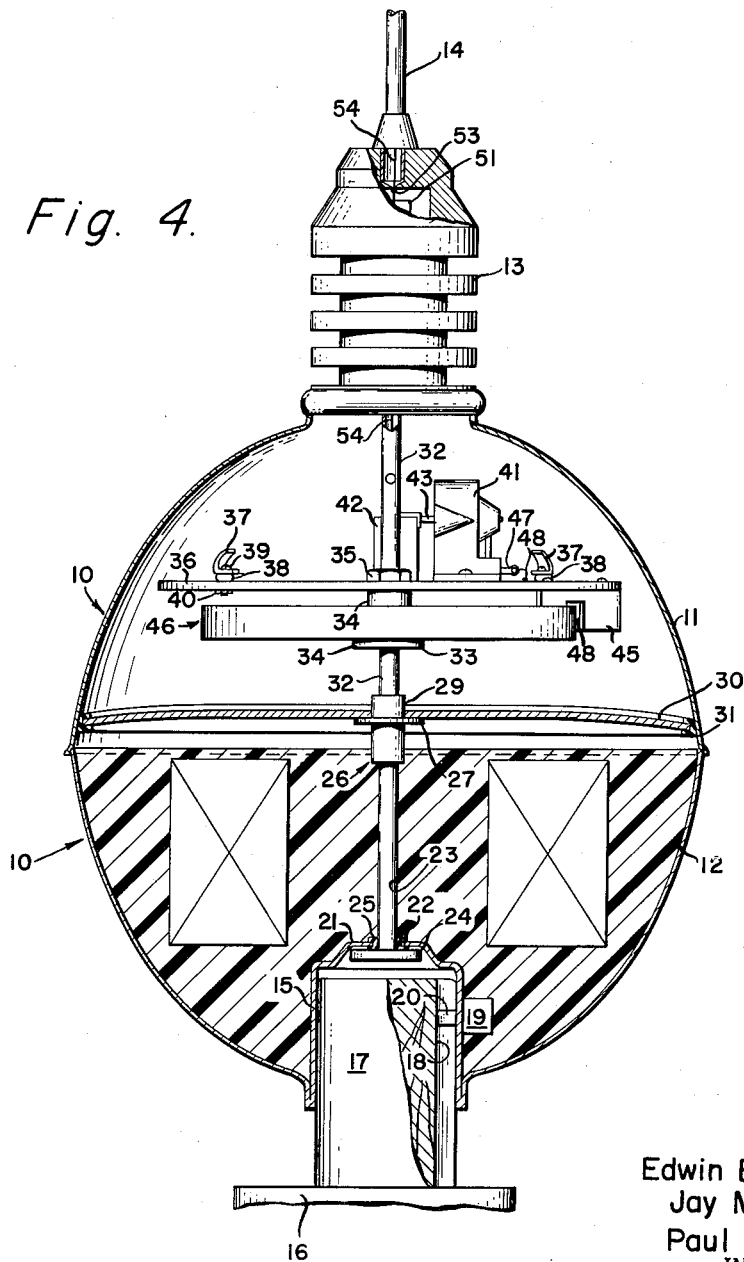
FIGURE 4 is an internal view of the invention, in particular to show the mechanism of a form of code generating device therefor.

As has been indicated briefly above, this invention encompasses a buoyant distress signal transmitting device. According to the invention a water tight buoyant housing encloses a radio transmitter and a mechanical code generator for operating the transmitter to generate a signal code corresponding to prearranged distress and identification signals. Atop the buoyant housing an antenna structure is provided to radiate the signals. The buoyant housing normally is mounted on a support base which additionally acts as an on-off switch control means. The support base is such that rotation of the buoyant container thereon operates the on-off switch to its "on" position. Alternatively, if the buoyant housing is removed from the mounting base or floats off of the mounting base the switch is activated and the transmitter starts operating.

Referring now to FIGURE 1, there is shown one embodiment of this invention in which the buoyant housing 10 is provided in the general shape of an egg having an upper half 11 and lower half 12. Attached to upper half 11 is an antenna loading coil and mounting 13. An antenna 14 is attached to loading coil and mounting 13. The egg shape of housing 10 was chosen for convenience. Any shape which may properly house the apparatus will do. The housing, though, must be buoyant, therefore size will be related to the weight of the included apparatus in order that the buoyancy is maintained.

Buoyant housing 10 is normally hollow, the two parts 11 and 12 being sealed together as at 29 to form a water tight enclosure. The loading coil and antenna mount 13 is sealed to upper portion 11 as at 61, described in greater detail below.

The lower portion 12 of buoyant housing 10 is cutaway in FIGURE 1 as shown at 28 to reveal the internal structure thereof. The bottom of housing 12 has a central depression 15. The depression may be very slightly tapered in shape. The diameter of depression 15, if tapered, decreases slightly into the housing.

Further details revealed by the cutaway area are the mounting base plug 17 having a support base 16. The base plug and support 16, 17 are generally circular. The plug portion 17 can be slightly tapered to fit into the depression 15 of lower portion 12 of housing 10. When depression 15 of housing 10 is set upon base plug 16, 17, housing 10 stands upright. Base plug 16, 17 may be fixedly attached to a part of a ship deck.

At one side of plug 17 a segment is cutaway as at 18 to form a flat portion comprising the chord of the circle of the mounting plug 17.

In the wall of depression 15 a miniature spring actuated switch 19 is mounted so that the body thereof is sealed within lower portion 12 of housing 10. The actuator pin 20 of microswitch 19 is shown in FIGURE 1 in its "on" position. Switch 19 in this instance is constructed for normally "on" operation when actuator pin 20 is out of the body of switch 19. When actuator pin 20 is depressed into the body of switch 19, the switch is in "off" condition. It may be seen that the "on" condition of switch 19 occurs when housing 10 is rotated on plug 17 so that actuator pin 20 of switch 19 is in the position shown in FIGURE 1.

In FIGURE 2, to which reference is now made, a cutaway view of the bottom of lower half 12 of housing 10 is shown. Within the housing a cross section area through plug 17 and switch 19 is shown to illustrate the "off" condition of switch 19 with pin 20 depressed into the housing of switch 19. This was accomplished by the rotation of buoyant housing 10 on plug 17 to the position shown in FIGURE 2 where switch 19 is now rotated 90° with respect to its position as shown in FIGURE 1 and FIGURE 3.

In FIGURE 3, to which reference is now made, a cross-sectional view of plug 17 in depression 15 is shown to correspond to the view of FIGURE 1, wherein the "on" condition of switch 19 is illustrated.

Switch 19 is normally used as the on-off power switch for the invention as will be further indicated below. It has been clearly indicated above that when the buoyant housing 10 is mounted by its circular depression 15 in the bottom of lower portion 12 on base 16, 17 so that the housing 10 is rotatable on plug 17, it may be rotated to an "on" position when switch 19 is opposite flat portion 18 of tapered plug 17, and to an "off" position when switch 19 is opposite any of the remainder of the circular portion of plug 17. It is clear therefore, that if the buoyant housing is removed from mounting base 16, 17 actuator pin 20 of switch 19 is in its "on" position, that is out of the housing of switch 19 and so therefore, whenever the buoyant housing 10 is removed from or falls off of the mounting plug 16, 17, switch 19 is "on" and power is applied to the internal mechanism of the automatic distress signaller as further delineated below.

In FIGURE 4, to which reference is now made, the housing of the automatic distress signaller has been drawn as if the housing were cut open to reveal the inner construction thereof. In particular, the parts in the upper portion 11 of housing 12 are shown. In the top 21 of depression 15 of the lower portion 12 of housing 10 a circular opening 22 is cut in which a sealing gasket 25 appears through which a captive assembly bolt 23 is inserted up into the lower portion 12 of housing 10. Bolt 23 has a head 24 which limits the extent to which the bolt 23 may go into the assembly and acts as a sealing element against gasket 25.

Within lower portion 12 of housing 10 at the opposite end of bolt 23 a threaded assembly bushing 26 is provided. Bushing 26 has a flange 27 which acts as a support for a circular baffle plate 30 shown in cross-section resting thereon. Baffle plate 30 is a thin disc-like plate having a sealing gasket 31 on its outer periphery. Plate 30 normally seals up into upper portion 11 of housing 10. The upper portion 29 of bushing 26 is threaded internally to secure the externally threaded end of a hollow screw 32. Over screw 32 a flanged bushing 33 is provided. Bushing 33 supports a code generator wheel bearing 34. A mounting plate 36 is provided for the transmitting oscillator, motor drive system, detector, and generator of the system, more fully described below. Mounting plate 36 is in one form a printed circuit board but may be of any other suitable nature that may occur to one skilled in this art. The use of a printed circuit plate for mounting plate 36 is preferable since greater uniformity, simplicity and stability of wiring of the elements is accomplished in this way and the system is generally more reliable under such conditions as may be encountered on shipboard or in an aircraft.

A nut 35 holds flanged bushing 33 to mounting plate 36. Mounting plate 36 has a threaded center hole by which it is attached to the outside of threaded hollow screw 32.

A code wheel 46 is mounted on bearing 34. Code wheel 46 is one of several forms which may be used with this invention and is further described below.

Mounting plate 36 is fixedly attached within the walls of upper portion 11 of housing 10 by means of the mounting brackets 37 which are welded to the inside of the housing. Bracket 37 may be threaded or punched to accommodate the mounting screws 39. A shock mounting element 38 is provided between mounting bracket 37 and plate 36. If the screws 39 are employed in a punched form of mounting bracket 37 then the nuts 40 may be provided to hold them in place. If brackets 37 are threaded nuts 40 are not required and the mounting screws are inserted from beneath. Other mounting devices are possible and may occur to those skilled in this art.

A motor 41 is mounted on plate 36. Motor 41 is coupled to a speed reducing gear box 42 by a shaft 43 and a worm gear 44. Motor 41 has power terminals 47 for connection to the power source which is normally mounted in the lower portion 12 of the housing 10 and to power switch 19.

Beneath mounting plate 36 a detector housing 45 is provided for the device to be used to detect the code generating operation of code generating wheel 46. It is to be noted that code generating wheel 46 as shown in FIGURE 4, has a generally shallow cup or tray-like configuration. The base of the cup or tray is adopted to rest on code wheel bearing 34 and rest and rotate on flange 33. The wall portion of code wheel 46 is thin and passes through the trough 48 of detector housing 45. The code wheel 46 and detector housing 45 are discussed in greater detail below.

Mounted on top of upper portion 11 of housing 10 is the loading coil assembly 13 and antenna 14 which have a number of internal details described below.

Figure 5:
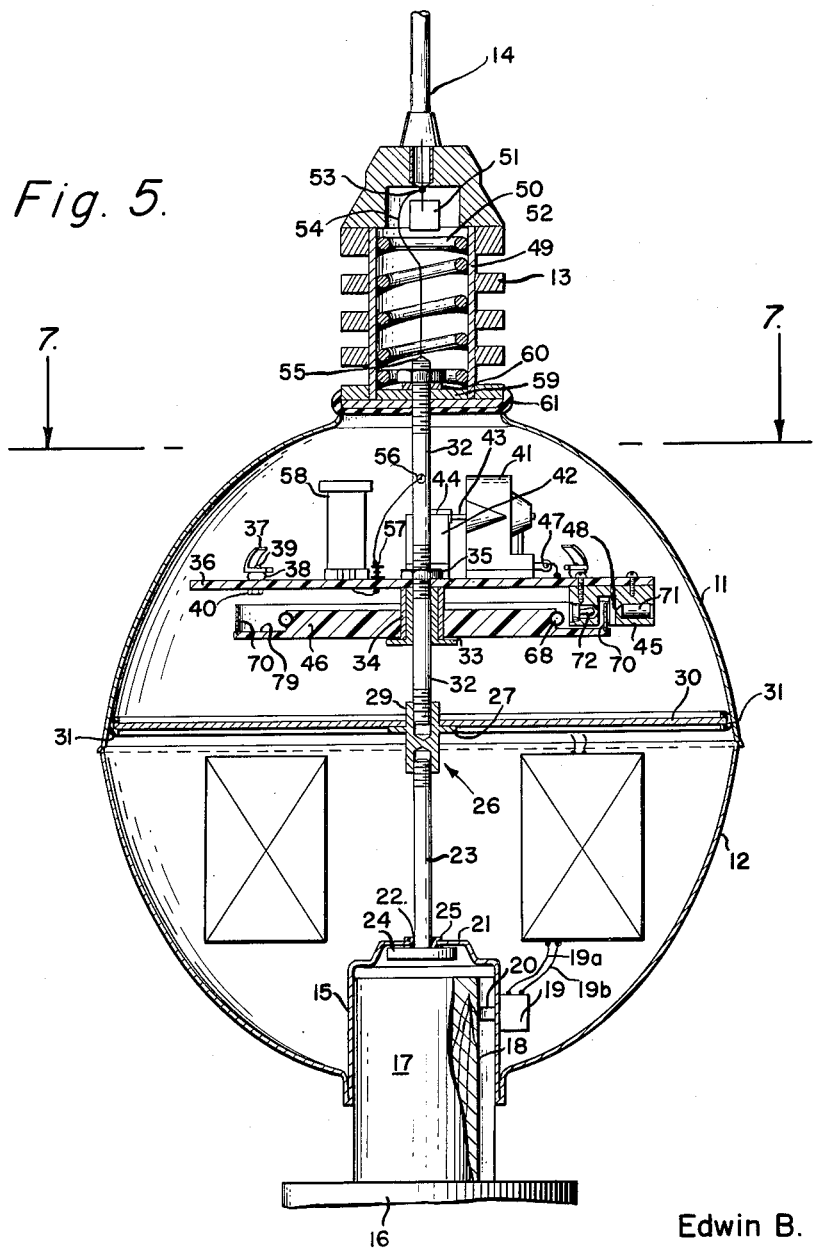
FIGURE 5 is a partially cross-sectional view of the internal details of the code generating portion of the invention shown in FIGURE 4, and includes some of the electrical elements of the transmitter thereof.

Referring now to FIGURE 5, a number of details of the items illustrated in FIGURE 4 may be seen in cross-sectional views to further describe them and their operation. Cross-sectional views are shown of mounting assembly bolt 23 in bushing 26 and its flange 27 showing how it supports sealing disc 30 and hollow screw 32. Flanged bushing 33 is also shown with plate 36 threaded on to it and held in place by nut 35. Between the flange of flanged bushing 33 and mounting plate 36, bearing 34 is positioned. Code wheel 46 rotates on bearing 34. Bearing 34 is slipped over flanged bushing 33.

Code wheel 46 has a peripheral code signal carrier 70 which may be a film alternately coated dark and light for photoelectric use as further described below, or it may be a grooved cylinder, a magnetic material coated cylinder or any of a number of related devices which might occur to one skilled in the art. As illustrated in FIGURE 5, however, the signal carrier 70 is a film which has dark and light areas. The longer dark areas or light areas, since either may be used, could indicate a "dash" in Morse code while shorter dark or light areas would indicate a "dot." For a distress call the code on the signal carrier 70 may include the sequence of dark and light areas spelling out "Mayday" or "SOS" and in addition include an identifying code signal such as an assigned number or group of letters corresponding to the "call" of the craft on which the distress signalling device of this invention may be used.

Code wheel 46 is undercut as at 79 so that on the inner diameter of the undercut a spring coil 68 may be wound. Spring coil 68 is one of the unusual features of the drive system of this invention and is further detailed and described in connection with FIGURE 6 below.

Detector housing 45 which was previously mentioned has a trough 48 through which signal carrier 70 passes in the rotation of code wheel 46. For different types of signal carriers such as 70, different types of detector devices in housing 45 will be required. As illustrated in FIGURE 5, detector housing 45 contains equipment for a photoelectric Keyer mechanism. The Keyer mechanism includes a photoelectric pickup 71 which may be a semiconductor sensing device such as described in the co-pending application of one of the joint inventors of this present invention. The co-pending application is Serial No. 620,687, Jay Mayer Block, entitled "Photo Electric Sensing Circuit," filed November 6, 1956.

The detector 71 is mounted on one side of the trough 48 of housing 45 outside the diameter of the code carrier 70. A lamp 72 is mounted on the other side of housing 45 within the diameter of code carrier 70. Lamp 72 faces detector 71. When a dark area of code carrier 70 passes between lamp 72 and detector 71 the light from lamp 72 is cut-off and does not fall on detector 71. Of course, where the code carrier 70 has no dark area light falls on detector 71. Detector 71 can be made to actuate a keying circuit either by biasing it to cut off when light is present or reducing a cut-off bias to an operative value in a circuit which may be so affected. In any case, the presence or absence of light falling on detector 71 is a control factor in keying a circuit by varying its bias accordingly.

Further details of the components within housing portion 11 include the components of the invention connected with the loading coil and antenna mounting 13 which is hollow as indicated at 49. Within hollow 49 a loading coil 50 is shown in FIGURE 5 partially cut away to illustrate its structural relation to the mounting 13. A variable antenna capacitor 51 is connected between loading coil 50 and antenna 14. A junction 53 between antenna 14 and capacitor 51 is also connected to a coupling lead wire 54 which is brought down through hollow 55 in threaded rod 32 and out through the opening 56 in rod 32 to an antenna terminal 57 of an oscillator output coil 58 part of the transmitting oscillator of this invention. Loading coil 50, which is connected at one of its ends to capacitor 51, is connected at its other end to the housing 10, corresponding to ground by means of a metal coupling washer 60 which makes contact with hollow mounting screw 32 through a metal disc 59 upon which coil 50 seats. Coil 50 may be soldered to disc 59. A gasket 61 seals the assembly of the loading coil 13 to the housing 11.

Figure 6:
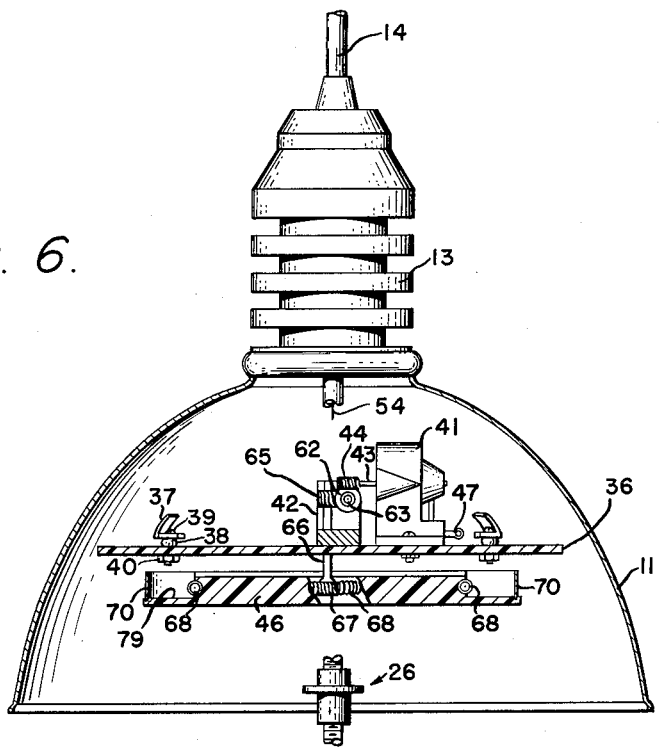
FIGURE 6 is a view of the upper portion of the housing of the invention, in particular to show details of the code generator driving mechanism.
Figure 7:
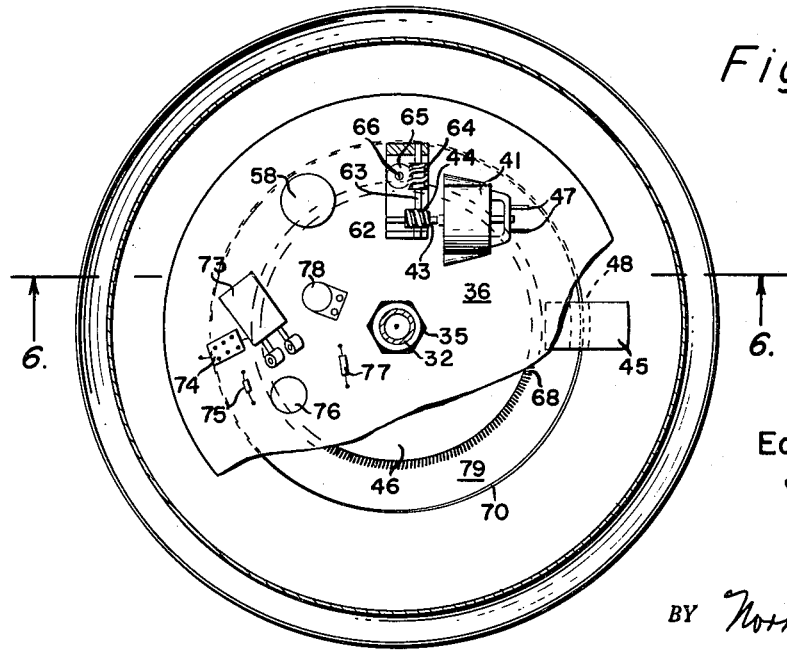
FIGURE 7 is a partially cross-sectional view of the invention looking down on the transmitting and code generator driving mechanism.

Referring now to FIGURES 6 and 7 there are shown a cut open side and top views respectively, of upper portion 11 of the housing 10 with sections of the internal components cut away to reveal the structure of the mechanical driving system of this invention. Drive motor 41 has previously been discussed. Motor 41 has a drive shaft 43 rotated by it. A worm gear 44 is fastened on shaft 43 to drive speed reducing gear box 42.

Within gear box 42 on a shaft 63 at a right angle to shaft 43, a pinion gear 62 is fastened which couples to worm gear 44 and is driven by the worm gear 44. On shaft 63 a worm gear 64 is fastened. Also within gear box 42 a shaft 66 is provided at a right angle to shaft 63. On shaft 63 a pinion gear 65 is fastened which couples to worm gear 64 and is driven by the worm gear 64. Shaft 66 goes down through the bottom of gear box 42 and has fastened to its end a pinion gear 67. Pinion gear 67 couples to spring driving gear 68 which is wound around the undercut 79 of code wheel 46.

In FIGURE 7, to which reference is now made, the spring gear 68 wound around the undercut portion 79 of code wheel 46 is more clearly shown under the cutaway portion of plate 36.

A further detail more clearly visible in FIGURE 7 is the relationship between code carrier 70 and housing 45 with its trough 48, through which carrier 70 passes as driven by code wheel 46 when rotated by the motors of gear 67 against spring gear 68.

In FIGURE 7, there are also shown some of the parts of the transmitting oscillator of this invention. These are further detailed below in connection with the discussion of FIGURE 12.

In FIGURE 8 a typical variant of code wheel 46 is shown utilizing a magnetic recording system instead of the photoelectric system previously described. A code carrier 80 on code wheel 46 is a narrow cylinder of magnetic recording material on which the code signals are recorded. Detector housing 45 for the magnetic recorded code system incorporates a magnetic pickup 81 positioned to make close contact with the recorded surface of magnetic code carrier 80.

In FIGURE 9 another alternative code carrier method is shown. A code carrier 90 is a thin cylinder of material on which is arranged alternate sections of a conducting coating or material separated by non-conducting material. The detector housing 45 for this type of code carrier as at 90 incorporates contact feelers 91 and 92 urged against either side of code carrier 90 by springs 93. When electric wires are connected to springs 93 the circuit between contact feelers 91 and 92 is closed by the presence of conducting material on code carrier 90 and the circuit is open between feelers 91 and 92 when non-conducting material is between them.

In FIGURE 10 a further alternative method of providing the code generating device is shown. In the method code wheel 46 has a code carrier 100 on it similar in construction to previously described carriers but having an undulating upper edge as shown at 101. The undulations 101 correspond to code signals. In order to sense the undulations a pickup device 102 is provided in detector housing 45. This pickup device may be a piezo electric element such as a phonograph pickup or a magnetic sensing element responsive to vertical motion wherein a feeler moves up and down on the undulations 101 of the code carrier.

In FIGURE 11 a still further embodiment of the code generating mechanism of this invention is shown. A code carrier 110 has laterally varying inscribed grooves 111. A pickup device 112 has a stylus 113 which rides in the grooves 111 to detect the code. Pickup device 112, though not shown in FIGURE 11, would be mounted in detector housing 45 similarly to those illustrated in FIGURES 8, 9, 10 and described previously.

In FIGURE 12 a typical transmitting oscillator circuit is shown. The circuit comprises push pull oscillator tubes 120 and 121. An oscillator crystal 73 is connected between the control grids 122 and 123 respectively of the oscillator tubes 120 and 121. Grid leak resistors 124 and 125 are connected in series across crystal 73. At the junction 126 of resistors 124 and 125 a bias control variable resistor 127 is connected in a rheostat connection with its variable arm 128 connected to ground 129. The point "A" corresponding to the junction 126 of grid leak resistors 124 and 125 and bias control resistor 127 is the point at which one of the detectors of one of the code generating systems described above is connected. The device connected at "A" may be the photoelectric pickup device 71, or magnetic detector 81, or contact feelers 91, 92 or pickup devices 102 or 112. This is illustrated in part in FIGURE 13.

Returning now to FIGURE 12 the remaining elements of the typical transmitting oscillator include the plate tank tuning system comprising tank coil 58 which has a primary 130 center tapped at 131 and a secondary 132. Coil 58 was previously shown as mounted on the panel 36. Capacitor 78 connected across primary 130 of coil 58 tunes the coil to a frequency in resonance with crystal 73. Variable capacitor 133 connected between one end 135 of primary 130 and ground 129 and variable capacitor 134 connected between the other end 136 of primary 130 and ground constitute a split-stator capacitor which is connected with motor 41 to provide a loading variation in the tuning of the transmitter frequency so that at the rate of rotation of motor 41 a frequency variation occurs. This will be further explained below. Adjustable capacitor 51 in series with loading coil 50 is connected across secondary 131 of coil 58.

In FIGURE 13a, a semi-schematic and block diagram of a typical magnetic pickup connection is shown. Magnetic pickup 81 is connected to a bias control amplifier 140 which is in turn connected to point "A" in FIGURE 12.

In FIGURE 13b, a typical feeler contact connection is shown. Feeler contacts 91 and 92 are connected between point A and B of FIGURE 12.

What is claimed as new is:

1. A marine distress signalling device comprising: a radio-transmitter; an antenna connected to said transmitter; a power source connected to said transmitter; an on-off switch having an actuator button which maintains said switch "off" on pressure applied thereto connected to said power source; an automatic rotatable code wheel assembly having a coded switching surface adapted to energize a switching transducer, a part of said code wheel assembly, said transducer being coupled between said transmitter and said source of power for intermittently operating said transmitter in accordance with the code on said wheel, said code being repeated with each rotation of said wheel; a buoyant water-tight housing having a deep, generally inwardly tapered opening in the bottom thereof mounting receptacle and adapted to contain said transmitter, said power supply and said automatic code wheel assembly in operative relation, and to float when on the water, said antenna being mounted on top of said housing, said on-off switching device being mounted in said mounting receptacle of said housing said actuator button of said switch protruding into said generally inwardly tapered opening and a tapered supporting mount for said housing shaped to interfit with said receptacle, interfitting with said receptacle said housing being disposed on said mount when not in use, said actuator button of said switch making contact with said mount to place said switch in its "off" position said switch being "on" when said housing is removed from said mount to transmit a distress signal in accordance with the code on said code wheel.

2. A distress signalling device comprising a buoyant housing; a radio frequency generating transmitter disposed within said housing mounting receptacle; said transmitter including an oscillator and an automatic rotatable, continuously repetitive coded switch connected with said transmitter and adapted to alternately turn said oscillator on and off in accordance with a predetermined code encoded upon said coded switch; a normally "on" pressure switch having an activating button and connected electrically with said transmitter, and mechanically disposed in said housing in said receptacle with said activating button outside of said housing; a mount interfitting said receptacle for supporting said housing in such fashion that said activating button is maintained in its "off" condition so long as said housing is on said mount, and an antenna mounted in said housing and connected to said transmitter for radiating the code signals generated by said oscillator cooperating with said coded switch when said housing is removed from or floats off of said mount.

3. In a coded radio signalling device housed in a buoyant watertight container having a mounting receptacle; a transmitter and a code generating means connected to said transmitter, said means comprising an automatic rotatable continuously repetitive code wheel having a code message element disposed about the periphery thereof, said element including alternately transparent and opaque areas corresponding to a distress signal code; a light source fixedly disposed on one side of said element and a photo electric detector fixedly disposed on the other side of said element opposite said light source, said detector connected to said transmitter and including means adapted to operate said transmitter in accordance with said code as said message element is rotated between said light source and said detector.

4. In a coded radio signalling device housed in a buoyant watertight container having a mounting receptacle, a transmitter and a code generating means connected to said transmitter, said means comprising an automatic rotatable continuously repetitive code wheel having a code message element disposed about the periphery of said wheel, said element including an alternate series of conducting and non-conducting strips disposed on said periphery in accordance with a distress signal code, and commutator contact terminals positioned in said code generating means to make contact with said element, and connected with said transmitter to operate said transmitter in accordance with said code as said code wheel is rotated automatically.

5. In a coded radio signalling device housed in a buoyant watertight container having a mounting receptacle, a signal transmitter and a code generating means connected to said transmitter, said means comprising an automatically rotatable continuously repetitive code wheel having a code message element including an engraved ring about the periphery of said wheel, the engraving in said engraved ring consisting of undulations corresponding to distress message information, and an electric transducer positioned on said code generating means so as to make contact with said engraving and connected to said transmitter to modulate said transmitter in accordance with the undulations of said engraved ring as said code wheel is rotated, whereby said transmitter will transmit said distress message information as a modulation on the transmitted signal.

6. A marine distress signalling system comprising a buoyant housing having a generally cylindrical mounting depression in the bottom thereof; a signalling transmitter disposed within said housing; an antenna disposed outside of said housing and connected through said housing to said transmitter; a normally closed pressure button actuated switch adapted to be open upon pressure, connected to said transmitter and disposed in said mounting depression in the bottom of said buoyant housing; and a mounting support having a configuration for mating with and insertion into said mounting depression; whereby when said mounting depression of said buoyant housing is mounted on said support said switch is maintained in its open condition by pressure of said support thereagainst and said transmitter is thereby not energized and when said housing is removed from or floats off of said support the pressure is removed and said switch is closed to energize said transmitter for signalling.

7. A marine distress signalling system comprising a sealed buoyant housing having a generally cylindrical upward mounting depression in the bottom thereof; a prearranged code signalling transmitter disposed within said housing; an antenna mounted externally in the top of said housing and connected through said housing to said transmitter; a normally closed switch adapted to be open upon pressure applied thereto, said switch being connected to said transmitter, and disposed in said depression; and a mounting support having a generally cylindrical configuration for mating with and insertion in said mounting depression, and to actuate said pressure switch, whereby when said housing is mounted on said mounting support, said support presses against said switch to maintain it in its open condition and said transmitter is not energized, and when said housing is removed from or floats off of said support said switch reverts to its normally closed condition to energize said transmitter to send out its pre-arranged code signals while floating, or otherwise removed from said support.

8. An automatic radio broadcast distress signaller buoy comprising: a water-tight buoyant housing having a generally melon-like shape, and having in its bottommost central surface, an inwardly tapered, generally cylindrical depression; a repetitively coded radio signal generating transmitter disposed within said housing; a radiating antenna affixed to the top of said housing, and insulated therefrom, said antenna being electrically connected to said transmitter; a normally closed switch having an actuator button therein which, when depressed, opens said switch, said actuator button protruding into said inward depression; said switch being electrically connected to said transmitter to maintain said transmitter in "on" condition or "off" condition depending on the position of said actuator button; and a vertical mounting post adapted to be attached to a boat deck, said post being shaped to interfit with said inwardly tapered depression of said housing so that when said housing is placed on said mounting post, said actuator button is depressed to maintain said transmitter in said "off" condition until said housing buoy is lifted from, or in a mishap at sea, floats off of said mounting post whereupon said actuator button is released to place said transmitter in its "on" condition to float upon the water and transmit its repetitively coded distress message.

References Cited in the file of this patent

UNITED STATES PATENTS

| | | |
|---|---|---|
| 1,414,273 | Gwynn | Apr. 25, 1922 |
| 2,473,050 | Camp | June 14, 1949 |
| 2,928,935 | Murray | Mar. 15, 1960 |
| 2,932,732 | Gray | Apr. 12, 1960 |